United States Patent
Shen

(10) Patent No.: US 8,099,717 B2
(45) Date of Patent: Jan. 17, 2012

(54) TRACKING METHOD FOR EMBEDDED SYSTEM

(75) Inventor: Hung Kai Shen, Hsinchu (TW)

(73) Assignee: Arcadyan Technology Corporation, Hsinchu (TW)

(*) Notice: Subject to any disclaimer, the term of this patent is extended or adjusted under 35 U.S.C. 154(b) by 1146 days.

(21) Appl. No.: 11/896,321

(22) Filed: Aug. 31, 2007

(65) Prior Publication Data

US 2008/0256519 A1    Oct. 16, 2008

(30) Foreign Application Priority Data

Apr. 12, 2007 (TW) ................ 96112913 A

(51) Int. Cl.
*G06F 9/44* (2006.01)
(52) U.S. Cl. .......... 717/128; 717/127; 717/151
(58) Field of Classification Search .......... 717/127–135, 717/140, 151, 155, 174; 712/200, 208, 219, 712/220, 227, 234, 240, 242
See application file for complete search history.

(56) References Cited

U.S. PATENT DOCUMENTS

| | | | | | |
|---|---|---|---|---|---|
| 5,408,650 | A | * | 4/1995 | Arsenault | 717/124 |
| 5,628,016 | A | * | 5/1997 | Kukol | 717/140 |
| 6,009,258 | A | * | 12/1999 | Elliott | 703/22 |
| 2006/0026579 | A1 | * | 2/2006 | Gardner | 717/151 |
| 2006/0265687 | A1 | * | 11/2006 | Lin | 717/101 |

OTHER PUBLICATIONS

Oren Avissar et al., Heterogeneous memory management for embedded systems; ACM New York, NY, USA ©2001; pp. 34-43.*
Daniel G. Bobrow et al., A model and stack implementation of multiple environments; Communications of the ACM CACM Homepage archive; vol. 16 Issue 10, Oct. 1973; ACM New York, NY, USA; pp. 591-603.*

* cited by examiner

*Primary Examiner* — Anna Deng
*Assistant Examiner* — Satish Rampuria
(74) *Attorney, Agent, or Firm* — Rosenberg, Klein & Lee

(57) ABSTRACT

A tracking method for embedded systems is disclosed. A stacking way is used for viewing and tracing. In the beginning, a program counter (PC) and a stack segment of a function are found out. Then an instruction of the function is learned according to the stack segment and further stack size of the function is calculated. In accordance with the stack size, a stack frame is viewed to find out a recursive program counter of a previous function. Next according to the recursive program counter, an entry point of the previous function is calculated. Therefore, the system knows the memory block is required by which function and further finds out what causes computer shut-down or program errors. Moreover, stack status before the error occurred in the stack frame is got so as to get a returning path that enables the processor going back to status before the error occurred.

7 Claims, 2 Drawing Sheets

TRACKING METHOD FOR EMBEDDED SYSTEM

BACKGROUND OF THE INVENTION

The present invention relates to a tracking method, especially to a tracking method for embedded systems.

Due to fast development of modern technology, processing speed of hardware or software in computer systems has continued to grow, especially for embedded systems. While executing software program, embedded systems consume memory resources. Thus how to effectively use memory is one of key factors that affect processing speed.

In the embedded system, one of the essential services is that a memory is dynamically allocated to a function. When each function makes a request, the embedded system dynamically allocates the memory block to the function. While once the memory block is not required by the function, the memory block consumed is returned to the embedded system. Thus the system resource sharing is achieved. Moreover, when each thread or process is run by a main function, other sub-functions are called to perform other functions according to dynamically external input, system information, or hardware interrupt and the sub-function continuingly calls other functions nestedly according to program logic. In such way with combinations of various functions, program execution is achieved.

During a process compiling the program that a first function calls a second function, the microprocessor learns content of Lth line code in the first function is calling the second function. After finishing compiling, function name and header of the Lth line code in the memory are saved while a first function's executable code corresponding to the first function and a second function's executable code corresponding to the second function are generated. When the embedded system executes the first function's executable code in the Lth line, the execution point of the program jumps to address of the second function's executable code. The second function's executable code is executed from an entry point of the second function.

In accordance with above description, program designers check the header of the memory block to learn the memory block is required by the first function. Therefore, all memory allocation is learned. Furthermore, root causes of system shut-down or program errors are found out by viewing the memory block.

However, while compiling the program, some memory is used to save memory allocation related information. That means function names and Lth line codes are saved. Moreover, when the program is running, memory allocation related information is also needed to be saved in the header of the memory block. Therefore, the memory and time consumed of the embedded system are increased while the processing efficiency is decreased. Thus there is a need to provide a novel tracking method for embedded systems that not only increases processing efficiency of embedded systems but also saves memory. Whiling executing a function, the whole call stack is got so as to learn reason and timing of the function being called.

SUMMARY OF THE INVENTION

Therefore it is a primary object of the present invention to provide a tracking method for embedded systems that gets status of a stack frame before errors occurred and further finds a returning path that enables processor back to the status before the error happened.

It is another object of the present invention to provide a tracking method for embedded systems that views memory block configured to which function by a program counter (PC) and a stack and further find out root sources of the system shut-down or program errors. The tracking method for embedded systems according to the present invention uses a stacking way for checking and tracking. Firstly a program counter (PC) and a stack segment of a function are taken. Then an instruction of the function is learned according to the stack segment and further stack size of the function is calculated. In accordance with the stack size, a stack frame is viewed to find out a recursive program counter of a previous function. Next according to the recursive program counter, an entry point of the previous function is calculated.

Moreover, the present invention includes a further step of checking whether the recursive program counter matches a threshold value or not. Once the recursive program counter matches a threshold value after being checked, calculating an entry point of the previous function. If the recursive program counter doesn't reach the program counter corresponding to a top-level function, calculating a recursive program counter of one more previous function so as to achieve the program counter corresponding to the top-level function.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
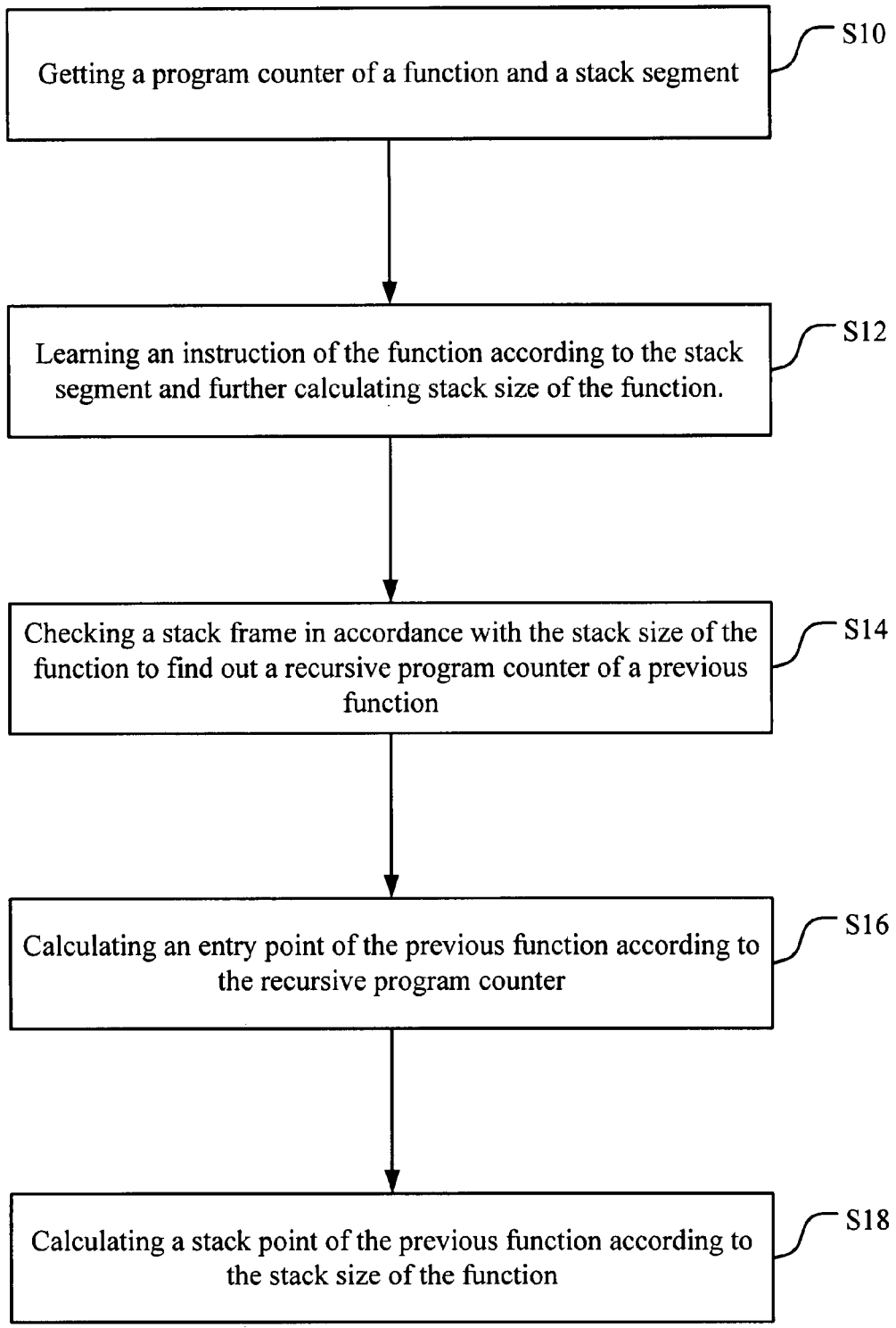
FIG. 1 is a flow chart of an embodiment according to the present invention.

Refer to FIG. 1, a tracking method for embedded systems according to the present invention performs detecting and tracking by a stack way. When each thread or process is run by a main function of the processor in embedded systems, other sub-functions are called to perform other functions according to dynamically external input, system information, or hardware interrupt and the sub-function continuingly calls other functions nestedly according to program logic. In such way with combinations of various functions, program execution is achieved.

By a stacking way, the present invention saves parameters of the function such as program counter (PC) and function point (FP) before the processor running each function. The program counter is used to trace executed instructions and find out address of the next instruction while the function point is a reference for the address of the space that saves the function. While calling the function name, the program executes the instruction in memory space pointed by the function name. Therefore, once there is an error happened while the processor executing the function or a shut-down, the program counter is get from the stack for returning to start address of the main function. Thus the processor turns back to normal status before the error occurred.

The steps to find out the start address of the main function are as followings:

Firstly, run step S10 get a program counter of a function and a stack segment because there is an error while a processor executing the function. Then take step S12 learn an instruction of the function according to the stack segment and further calculate stack size of the function. In this step, the instruction in each function includes at least one operation code (OP code) and an operation. The OP Code is used to save codes for instructions while different instructions have different OP Code. And the OP Code of each instruction has fixed bit size. According to the OP Code, the processor runs the operation represented by the OP Code. The operation is used to save address of data necessary for executing the OP Code. That means locations of objects executed by the processor. In the present invention, the stack size of the function is calculated according to the feature that the OP Code of each instruction has fixed bit size.

Next run step S14, view a stack frame and find out a recursive program counter of the previous function. In this step, due to First In Last Out (FILO) character of the stack and the fact that parameters of each function are saved in the stack segment of the stack frame in the order called by the function, the stack frame is viewed according to the stack size for finding out the recursive program counter of the previous function. Refer to step S16, according to the recursive program counter, an entry point of the previous function is calculated. In this step, the entry point is get according to the address pointed by the recursive program counter. That's start address of the previous function. Then run step S18, calculate stack point (SP) of the previous function. In this step, the stack point is returned to the stack status before the function being executed. In this embodiment, trace back from the current function to the previous function.

Figure 2:
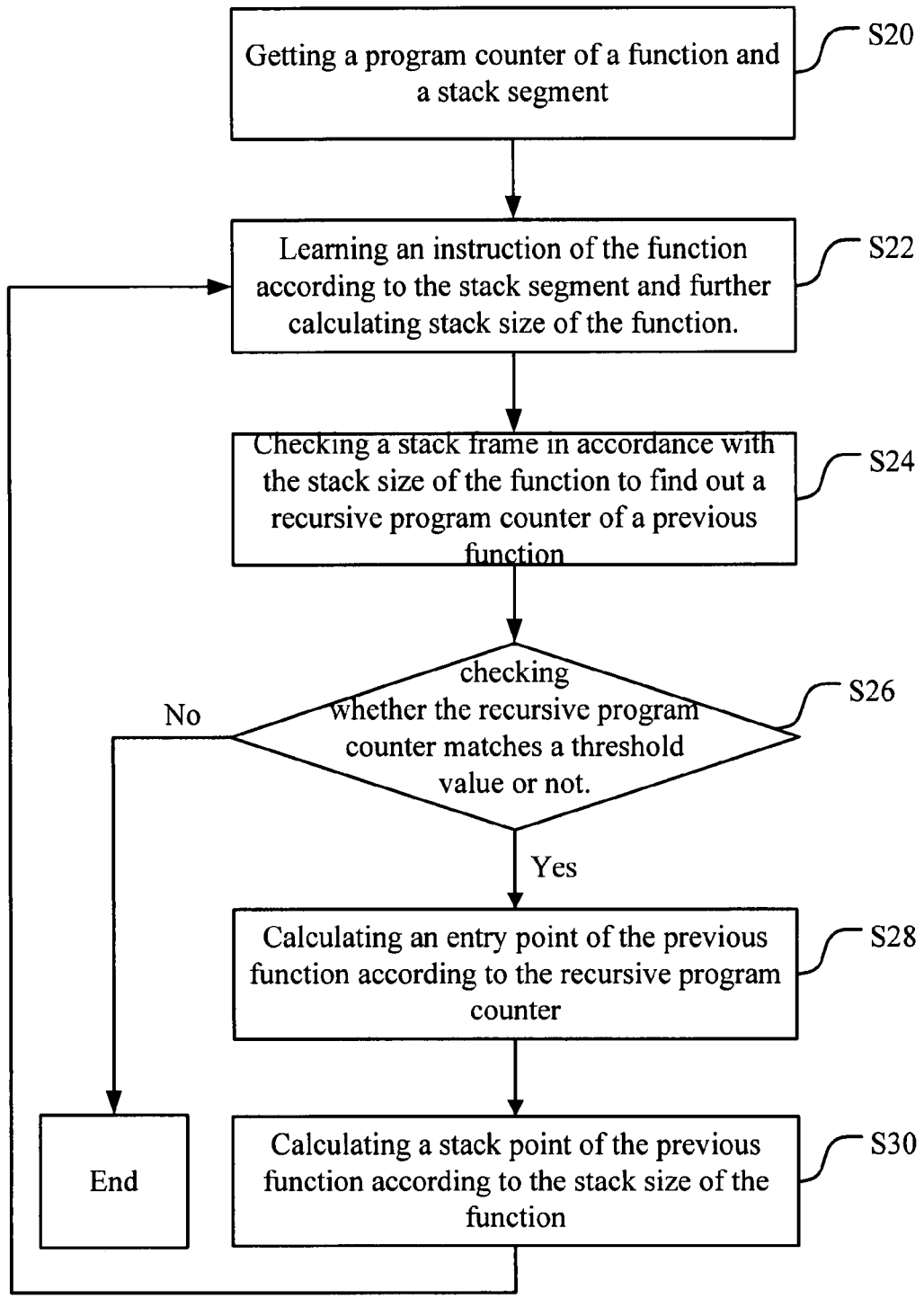
FIG. 2 is a flow chart of another embodiment according to the present invention.

Refer to FIG. 2, a further step is added in this embodiment because that a program consists of a plurality of functions. Refer to step S26, checking whether the recursive program counter matches a threshold value or not. When the recursive program counter matches the threshold value, refer to step S28, calculate an entry point of the previous function according to the recursive program counter. If not, end up the work flow. The threshold value is a program counter (PC) corresponding to an up one level function.

When the recursive program counter doesn't reach the program counter (PC) corresponding to the top-level function, go back to the step S22 after finishing step S30, calculate a recursive program counter of a further previous function for achieving the program counter (PC) corresponding to the top-level function. Thus the stack status before the error occurred in the stack frame is obtained and further get a returning path that makes the processor back to status before the error occurred.

In addition, the embodiment can be applied to tracking memory and further enables programmers to check memory error. By adding a time parameter in the stack segment and following the work flow mentioned above, a call path in the memory block is learned. Furthermore, which memory block is allocated to which function request by the computer system is learned. Therefore, all memory allocation is found out and sources of program error are also found by viewing memory arrangement for functions.

In summary, a tracking method for embedded systems according to the present invention performs detection and tracking by a stacking way. Moreover, a recursive program counter is obtained according to a program counter and an operation code of an instruction of the function so as to calculate an entry point of the previous function. Thus the system knows the memory block is required by which function and further finds out what problem occurred that causes computer crash or program errors. Moreover, stack status before the error occurred in the stack frame is learned easily so as to get a returning path that enables the processor returning to status before the error occurred.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A tracking method for embedded systems that performs detecting and tracking by a function stack way comprising steps of:
   getting a program counter (PC) and a stack segment of a function;
   learning an instruction of the function according to the stack segment and further calculating stack size of the function;
   checking a stack frame in accordance with the stack size of the function to find out a recursive program counter of a previous function; and
   calculating an entry point of the previous function according to the recursive program counter; and
   calculating an entry point of the previous function once the recursive program counter matches a threshold value after being checked, the threshold value being a program counter (PC) corresponding to an up one level function,
   wherein once the recursive program counter doesn't reach the program counter corresponding to a top-level function, calculate a recursive program counter of one more previous function so as to achieve the program counter corresponding to the top-level function.

2. The method as claimed in claim 1, wherein the method further comprising a step of:
   calculating stack point (SP) of the previous function according to the stack size of the function.

3. The method as claimed in claim 1, wherein in the step of getting an instruction of the function according to the stack segment and further calculating stack size of the function, the stack size of the function is calculated according to operation code (op code) of the instruction of the function.

4. The method as claimed in claim 1, wherein the method is applied to track memory.

5. The method as claimed in claim 1, wherein the method is applied to embedded systems with errors occurred.

6. The method as claimed in claim 1, wherein the entry point is start address of the previous function.

7. The method as claimed in claim 1, wherein an address corresponding to the previous function is generated according to the recursive program counter and then an entry point of the previous function is calculated according to the recursive program counter once address corresponding to the previous function matches the threshold value after being checked.

* * * * *